United States Patent [19]
Hua et al.

[11] Patent Number: 5,442,540
[45] Date of Patent: Aug. 15, 1995

[54] SOFT-SWITCHING PWM CONVERTERS

[75] Inventors: Guichao C. Hua; Fred C. Lee, both of Blacksburg, Va.

[73] Assignees: The Center for Innovative Technology, Herndon; Virginia Polytechnic Institute & State University; Virginia Tech Intellectual Properties, Inc., both of Blacksburg, all of Va.

[21] Appl. No.: 903,859

[22] Filed: Jun. 25, 1992

Related U.S. Application Data

[63] Continuation-in-part of Ser. No. 897,674, Jun. 12, 1992, Pat. No. 5,262,930.

[51] Int. Cl.$^6$ .................................... H02M 7/5387
[52] U.S. Cl. ............................ 363/98; 363/17; 363/132
[58] Field of Search .............. 363/17, 56, 98, 132

[56] References Cited

U.S. PATENT DOCUMENTS

| | | | |
|---|---|---|---|
| 4,661,897 | 4/1987 | Pitel | 363/17 |
| 4,720,667 | 1/1988 | Lee et al. | 323/271 |
| 4,785,387 | 11/1988 | Lee et al. | 363/21 |
| 4,800,476 | 1/1989 | Harada et al. | 363/16 |
| 4,846,479 | 9/1989 | Sterigerwald et al. | 363/17 |
| 4,860,189 | 8/1989 | Hitchcock | 363/132 |
| 4,945,462 | 7/1990 | Lieberman | 363/17 |
| 5,060,130 | 10/1991 | Sterigerwald | 363/65 |
| 5,132,889 | 7/1992 | Hitchcock et al. | 363/17 |
| 5,157,592 | 10/1992 | Walters | 363/17 |
| 5,231,563 | 7/1993 | Jitaru | 363/98 |
| 5,245,520 | 9/1993 | Imbertson | 363/17 |
| 5,262,930 | 11/1993 | Hua et al. | 363/21 |

OTHER PUBLICATIONS

"Zero-Voltage Switching Technique in High-Frequency Off-Line Converters"; Milan M. Jovanovic et al; IEEE Applied Power Electronics Conference Proceeding, 1988.

"Design Considerations for High-Voltage High-Power Full-Bridge Zero-Voltage-Switched PWM Converter"; Sabate et al.; IEEE Applied Power and Electronics Conference Proceeding, 1990.

*Primary Examiner*—Steven L. Stephan
*Assistant Examiner*—Adolf Berhang
*Attorney, Agent, or Firm*—Whitham, Curtis, Whitham & McGinn

[57] ABSTRACT

A full-bridge zero-voltage-switching pulse-width-modulated converter employs a saturable reactor in place of the linear inductor in order to reduce current stress on the active switches, reduce voltage stress on the rectifier diodes, and reduce secondary parasitic ringing. The zero-current-switching full-bridge pulse-width-modulated converter embodiment of the invention contemplates the provision of active switches that are zero-current-switched and passive switches, such as diode switches, that are zero-voltage-switched.

4 Claims, 10 Drawing Sheets

SOFT-SWITCHING PWM CONVERTERS

The present application is a continuation-in-part (CIP) of U.S. patent application Ser. No. 07/897,674, filed Jun. 12, 1992 now issued as U.S. Pat. No. 5,262,930.

BACKGROUND OF THE INVENTION

1. Field of the Invention

The present invention is generally related to pulse-width-modulated d.c.-to-d.c. converters, and more particularly to improvements in pulse-width-modulated converters employing zero-voltage-switching and improvements in pulse-width-modulating converts employing zero-current-switching.

2. Description of the Prior Art

Those skilled in the art have recognized the benefits and desirability of operating pulse-width-modulated (PWM) converters at high frequencies; high frequency operation allows a size and weight reduction of the converter for a given power rating. However, switching losses, component stresses, and noise due to parasitic oscillations are inherent problems with PWM technology, and these problems have limited, as a practical matter, the operating frequency of PWM converters.

Recently, new techniques have been proposed for high-frequency power conversion to reduce the switching losses in traditional PWM converters. Among them, the full-bridge (FB) zero-voltage switched (ZVS) resonant-transition PWM technique is deemed most desirable for many applications since it features the merits of both ZVS quasi-resonant (QR) and PWM techniques while avoiding their major drawbacks. Switching losses in the ZVS-PWM converters are significantly reduced without the penalty of a significant increase of conduction loss. Furthermore, the circuit operates with a constant frequency. However, due to a loss of duty cycle in the ZVS-PWM converters, the current and voltage stresses of the switches are significantly increased as compared to a PWM counterpart. In addition, parasitic ringing between the transformer leakage inductance (resonant inductance) and diode junction capacitance increases switching loss and switching noise.

FIG. 1 shows a prior art full-bridge ZVS-PWM converter comprised of a voltage source Vi, four switches Q1–Q4, four diodes D1–D4, inductor Lr, a resonant circuit comprised of Lf and Cf, and a load resistor R. The full-bridge zero-voltage-switching pulse-width-modulated converter can be viewed as two parallelled half-bridge zero-voltage-switching quasi-resonant-converters, where the phase-shift control is introduced. The full-bridge zero-voltage-switching pulse-width-modulated converter is a development of zero-voltage-switching quasi-resonant-converter technique. The zero-voltage-switching quasi-resonant-converter in the full-bridge zero-voltage-switching pulse-width-modulated are described in the following materials: "Zero-voltage switched quasi-resonant converters," by K. H. Liu and F. C. Lee, U.S. Pat. No. 4,785,387, Nov. 15, 1988; "Zero-voltage-switching technique in high-frequency off-line converters," by M. M. Jovanovic, W. A. Tabisz and F. C. Lee, *IEEE Applied Power Electronics conference Proceeding*, 1988; "Design considerations for high-voltage high-power full-bridge ZVS-PWM converter," by J. A. Sabate, V. Vlatkovic, R. Rideley, F. C. Lee and B. H. Cho, *IEEE Applied Power and Electronics Conference Proceeding*, 1990; "Full-bridge lossless switching converter," by R. L. Steigerwald, K. D. T. Ngo, U.S. Pat. No. 4,864,479, Sep. 5, 1989; and "Full-bridge power converter circuit," by L. J. Hitchcock, U.S. Pat. No. 4,860,189, Aug. 22, 1989.

Compared with a full-bridge (FB) pulse-width-modulated (PWM) converter, the effective duty ratio on the transformer secondary side, De, is decreased by:

$$D_e = D/(1 + (L_r f_s)/((N_p/N_s)^2 R))$$

where D is the primary duty ratio, R is the load resistance, and fs is the switching frequency. A larger resonant inductance corresponds to a smaller effective duty ratio, which in turn requires a smaller transformer turns ratio ($N_p/N_s$) to meet the line condition. Consequently, the primary current magnitude and the secondary voltage magnitude are increased, resulting in a reduction of the conversion efficiency. Another drawback to this converter is the severe parasitic ringing between the diode junction capacitances and the transformer leakage inductance. This ringing is more severe than that in a PWM converter since the transformer leakage inductance needed in the ZVS-PWM converter is considerably higher than that in a PWM converter. This ringing frequency is:

$$f_r = N_p/N_s/2\pi \sqrt{L_r C} ,$$

where C is the equivalent capacitance of the rectifier diodes and the transformer windings. The greater the transformer leakage inductance, the lower the ringing frequency. Lower ringing frequency leads to higher diode voltage stresses, higher snubber loss, and higher switching noise.

In ZVS-PWM or ZVS quasi-resonant converters, the active switches operate with ZVS, hence MOSFETs are usually preferred. For high-power applications, large voltage and current power devices such as BJTs, IGBTs or GTOs, must be employed. These devices, however, favor ZCS. Unfortunately, the high-current stresses of the active switches and the high-voltage stresses of the diodes in ZCS-QRCs, together with their variable-frequency operation, make the ZCS-QR technique less attractive for high power applications. On the other hand, as high power devices like IGBTs have relatively small output capacitances, the capacitive turn-on losses associated with PWM or ZCS operation, and parasitic ringing problems caused by the output capacitances of the IGBTs, become less severe as compared to MOSFETs. Furthermore, the operation frequency of IGBT circuits is considerably lower than that of MOSFET circuits.

SUMMARY OF THE INVENTION

One object of the invention is the provision of a zero-voltage-switching full-bridge pulse-width-modulated converter for high frequency operation with low switching losses, low stress, low noise, and constant frequency operation.

Another object of the invention is the provision of an improved zero-current-switching full-bridge pulse-width-modulated converter.

Briefly, in one embodiment, the invention contemplates the provision of a full-bridge zero-voltage-switching pulse-width-modulated converter of the type generally discussed in connection with FIG. 1, but employing a saturable reactor in place of the linear inductor in order to reduce current stress on the active switches, reduced voltage stress on the rectifier diodes and reduce secondary parasitic ringing. The zero-current-switching full-bridge pulse-width-modulated converter embodiment of the invention contemplates the provision of active switches that are zero-current-switched and passive switches, such as diode switches, that are zero-voltage-switched. This converter combines the benefit of zero-current quasi-resonant techniques and pulse-width-modulated techniques.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
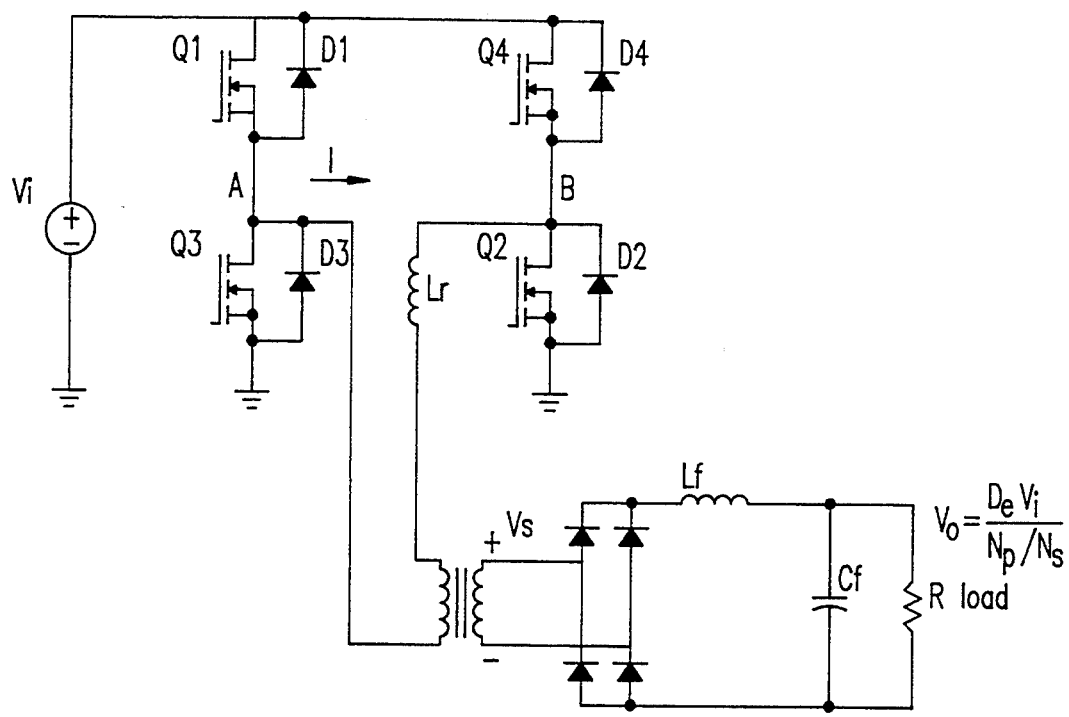
FIG. 1 is a schematic diagram with accompanying waveforms of a prior art full-bridge zero-voltage-switching pulse-width-modulated converter.
Figure 1:
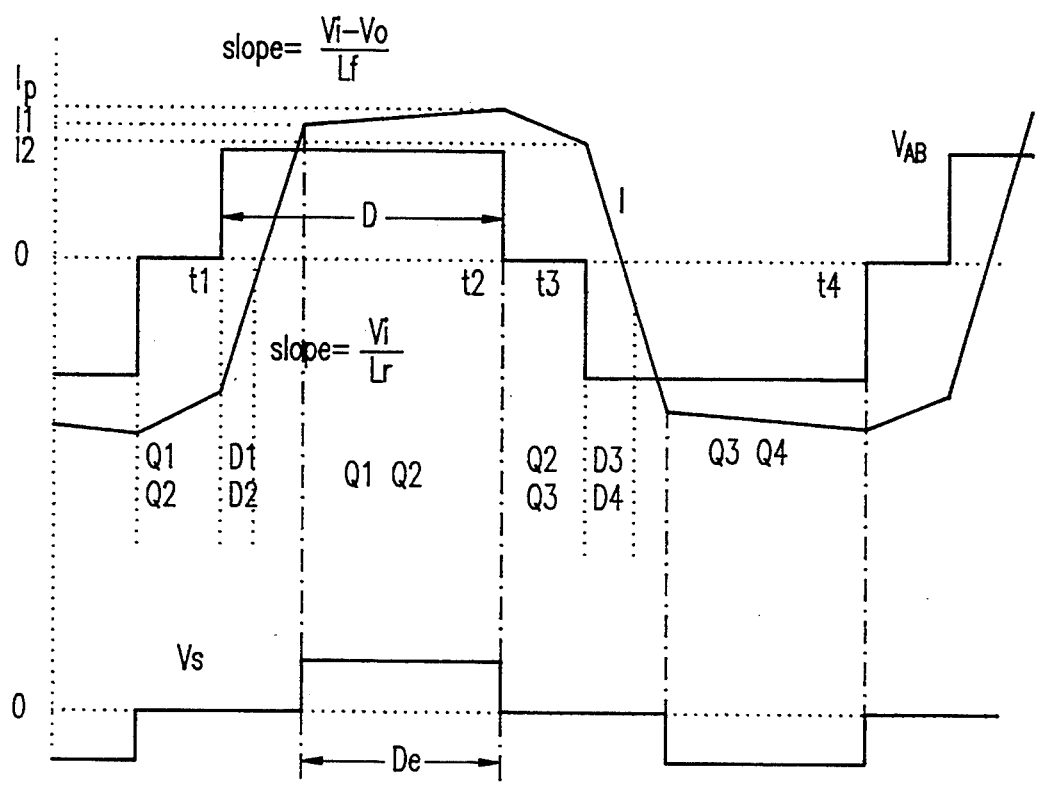
Figure 2:
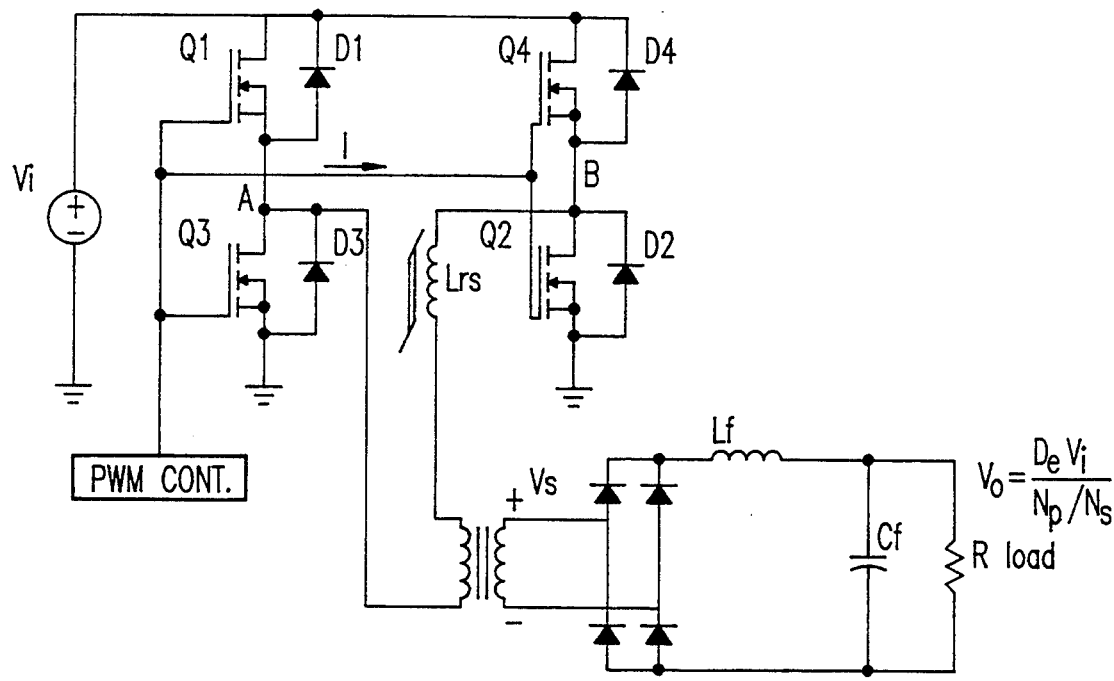
FIG. 2 is a schematic diagram similar to FIG. 1 of a full-bridge zero-voltage-switching pulse-modulated converter in accordance with the teachings of this invention.
Figure 2:
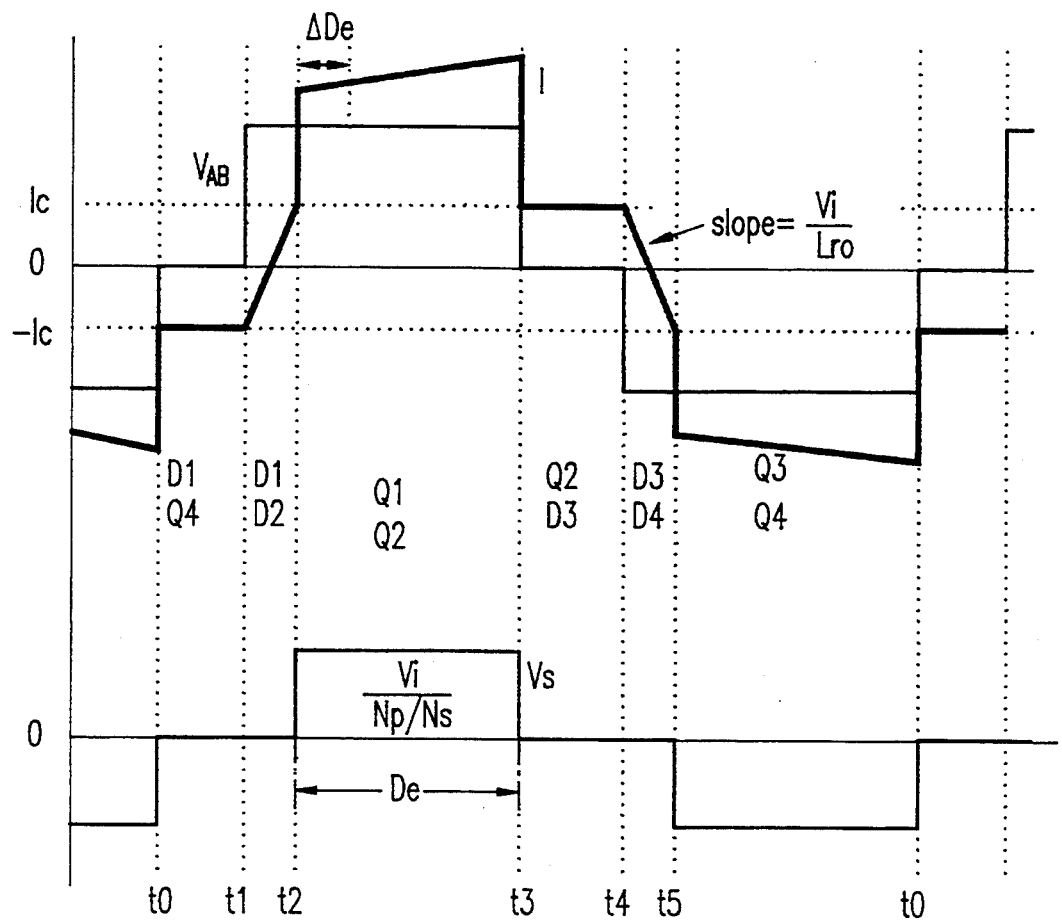

Referring now to FIG. 2, compared to a FB ZVS-PWM converter shown in FIG. 1, the converter of this invention is topologically the same as that shown in FIG. 1, except that a saturable inductor Lrs is used in place of the linear inductor Lr. It can be seen that the waveforms of the new circuit are similar to those of the ZVS-PWM converter in FIG. 1 (except at the time $t_0$, $t_2$, $t_3$, and $t_5$, where the inductor current reaches Ic, and the inductor goes into or comes out of saturation). Due to the saturation of the resonant inductor, the effective duty ratio of the converter is increased. The secondary parasitic ringing is also greatly reduced because the resonant inductor is saturated, and its inductance is much reduced before an abrupt voltage is applied to the rectifier diodes. The much reduced inductance does not result in significant ringing with the junction capacitances of the diodes. Therefore, the drawbacks of the circuit shown in FIG. 1 are greatly alleviated.

Figure 3A:
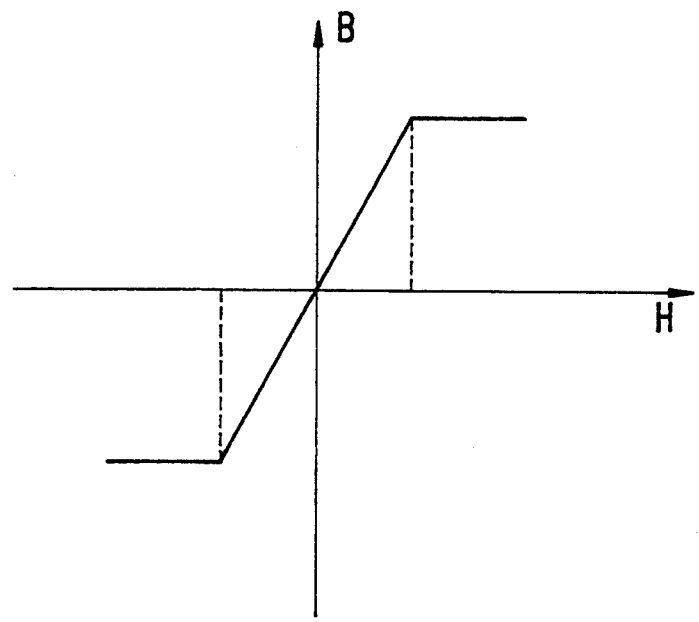
FIGS. 3a and 3b illustrate the B-H characteristic of the saturable core and the inductance vs. current characteristics of the saturable inductor respectively.
Figure 3B:
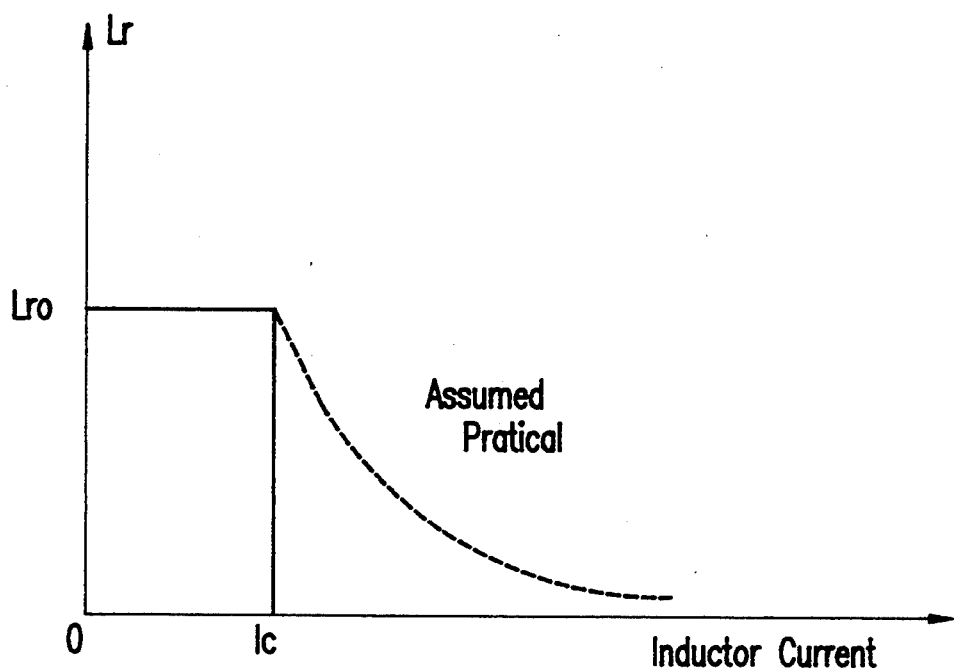

The saturable core Lrs is assumed to have a B-H characteristic as shown in FIG. 3(a). Thus the saturable inductor has the inductance vs. current characteristics shown in FIG. 3(b), where Lro is the inductance before the inductor is saturated at the critical saturating current, Ic.

Figure 4:
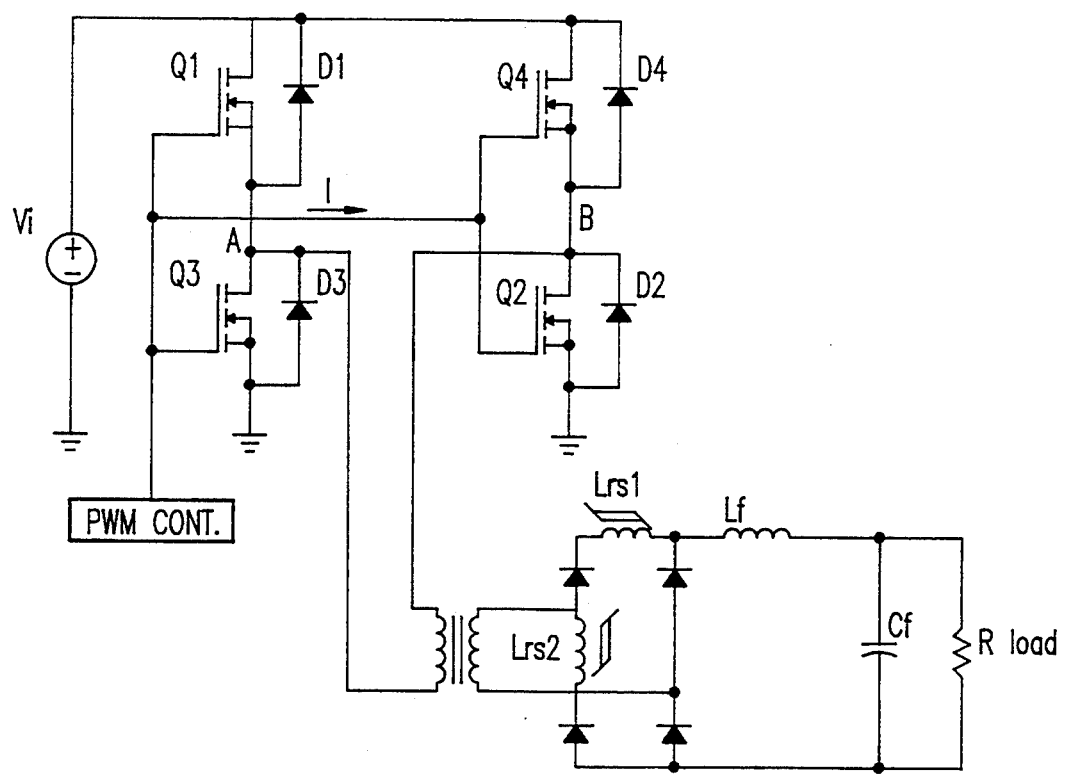
FIG. 4 shows another embodiment of a full-bridge zero-voltage-switching converter in accordance with the teachings of this invention.

Referring now to FIG. 4, an alternative embodiment of the invention is to move the resonant inductor from the primary to the secondary. This embodiment is also applicable to a full-bridge converter with a half-bridge rectifier. The flux in Lr1 or Lr2 goes only from zero flux to the saturation flux, instead of traveling from negative saturation to positive saturation. When the saturable reactors are used in the secondary, the magnetizing energy can also be utilized to achieve ZVS operation. For the circuit without the secondary saturable reactors, the peak magnetizing current has to be larger than the reflected output current to implement ZVS. This leads to an increase in transistor conduction losses by as much as 35%. When the saturable reactors are used, as shown in FIG. 4, the conduction loss can be minimized. During switching transition, the saturable reactor functions as an auxiliary switch. It blocks the magnetizing current from going to the secondary side. The magnetizing current is then utilized to discharge the transistor output capacitances. Therefore, the minimum peak magnetizing current required to achieve ZVS can be much lower than the reflected output current. In addition, as long as the converter is designed to achieve ZVS at heavy load and high line, ZVS operation of the converter will be ensured for the entire load and line range.

Figure 5:
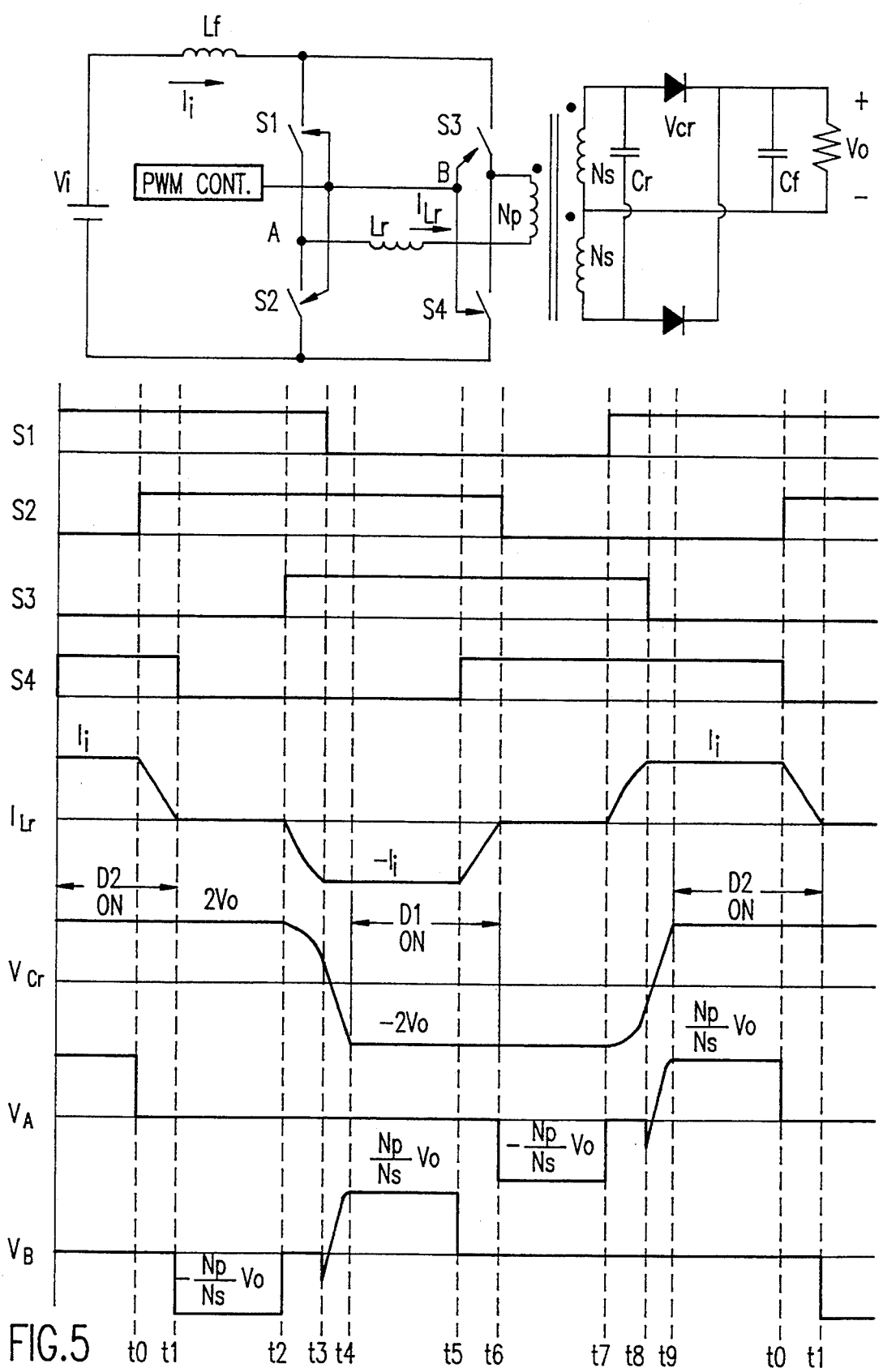
FIG. 5 is a schematic diagram with accompanying waveforms of an embodiment of a full-bridge zero-current-switched pulse-width-modulated converter in accordance with the teachings of this invention.

Referring now to FIG. 5, a full-bridge (FB) zero-current-switched PWM converter has semiconductor switches S1, S2, S3 and S4 arranged in a full-bridge configuration. These four switches S1-S4 are active switches and are phase-shifted controlled by a pulse-width-modulating controller. The inductor Lr is the resonant inductor and the capacitor Cr is the resonant capacitor. The transformer leakage, rectifier diode capacitances, and the transformer winding capacitances are utilized to establish resonance in the active switches S1-S4 and the passive switches diodes D1 and D2. In this converter, the active switches are zero-current-switched, and passive switches are zero-voltage-switched. The converter combines the benefits of ZCS-QR and PWM techniques. It is suitable for many applications, especially for high output voltage.

Figure 6A:
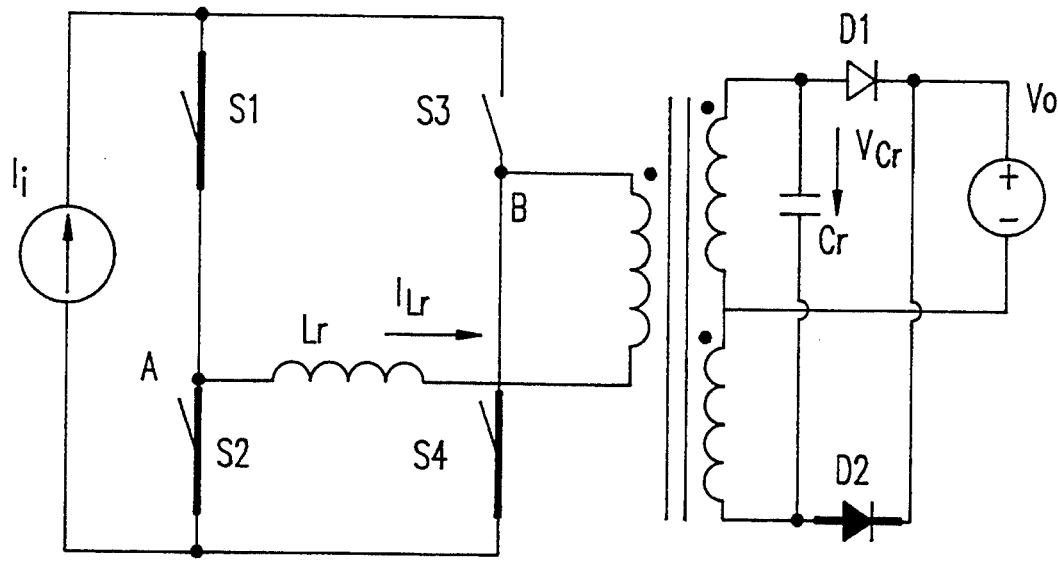
FIGS. 6a through 6j illustrate the equivalent circuit for the circuit shown in FIG. 5 at ten operational stages.
Figure 6B:
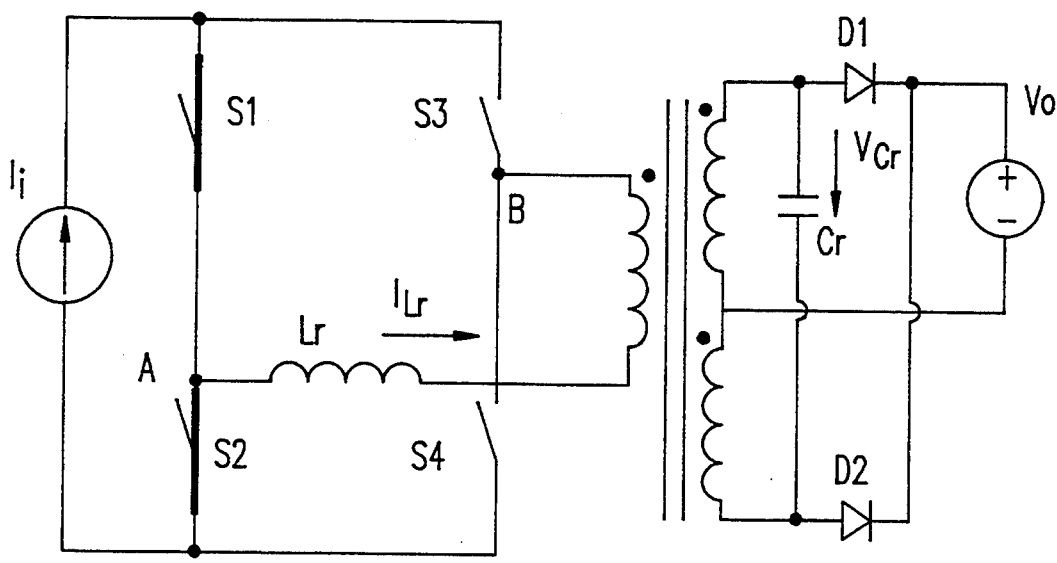
Figure 6C:
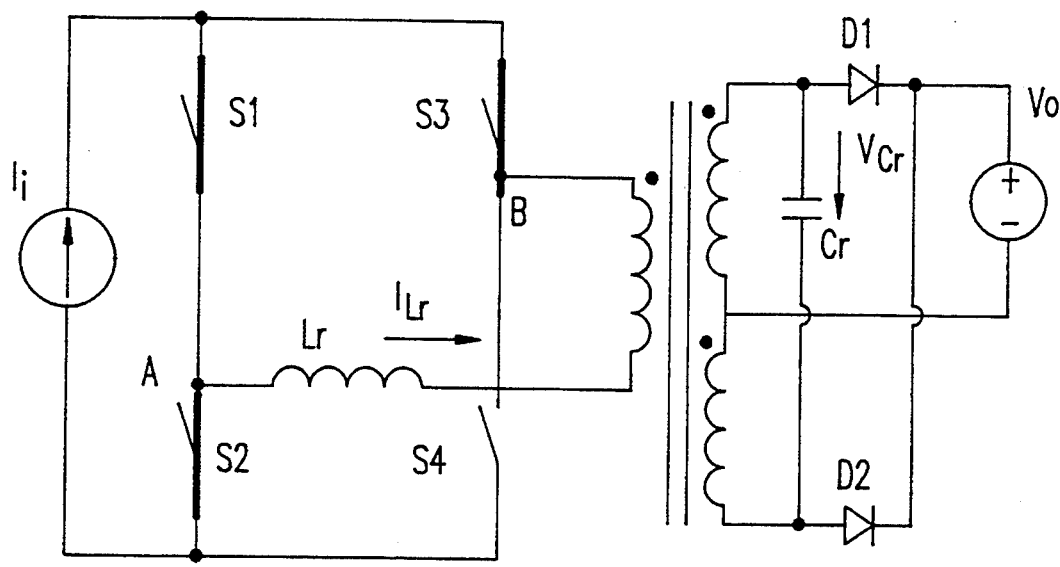
Figure 6D:
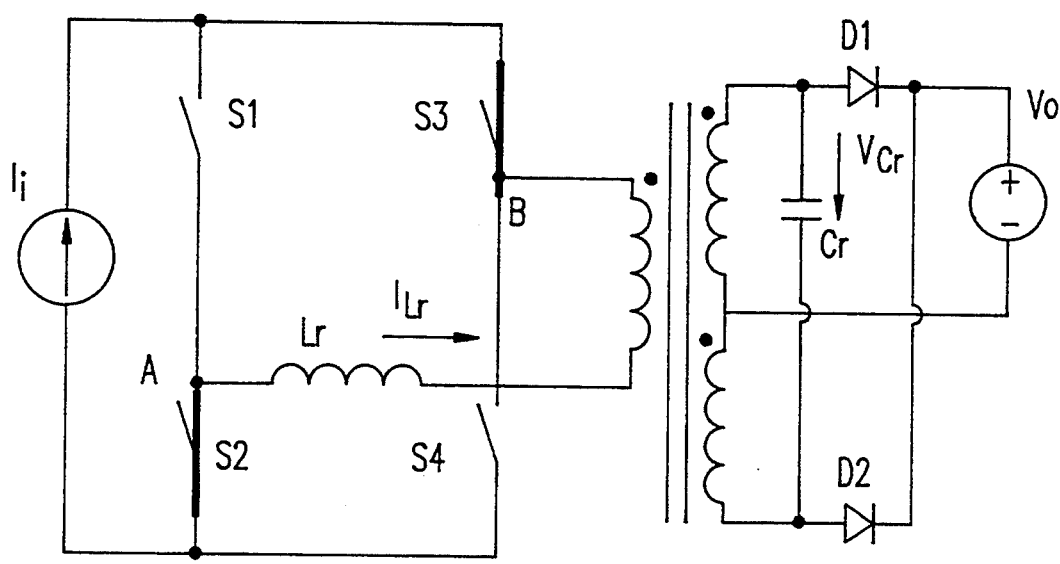
Figure 6E:
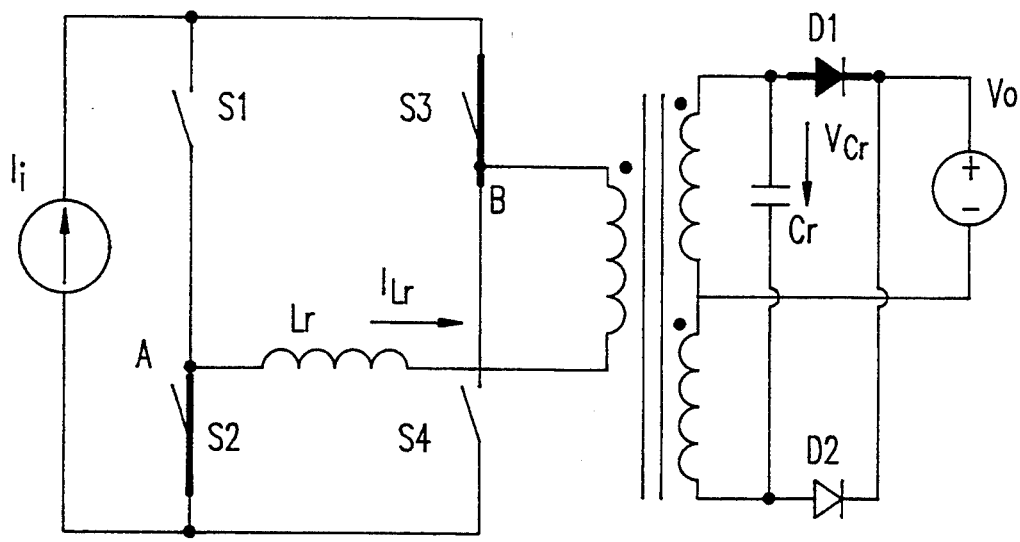
Figure 6F:
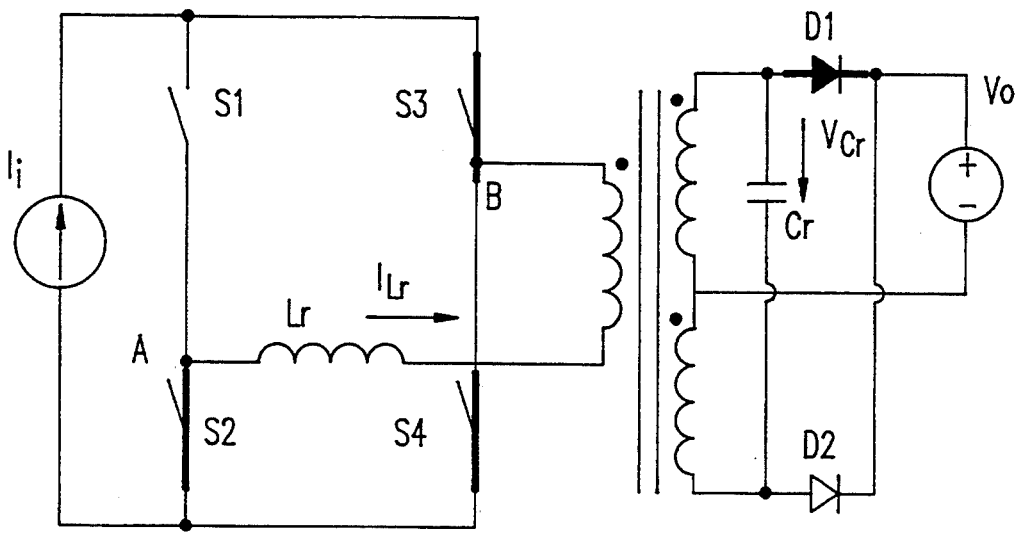
Figure 6G:
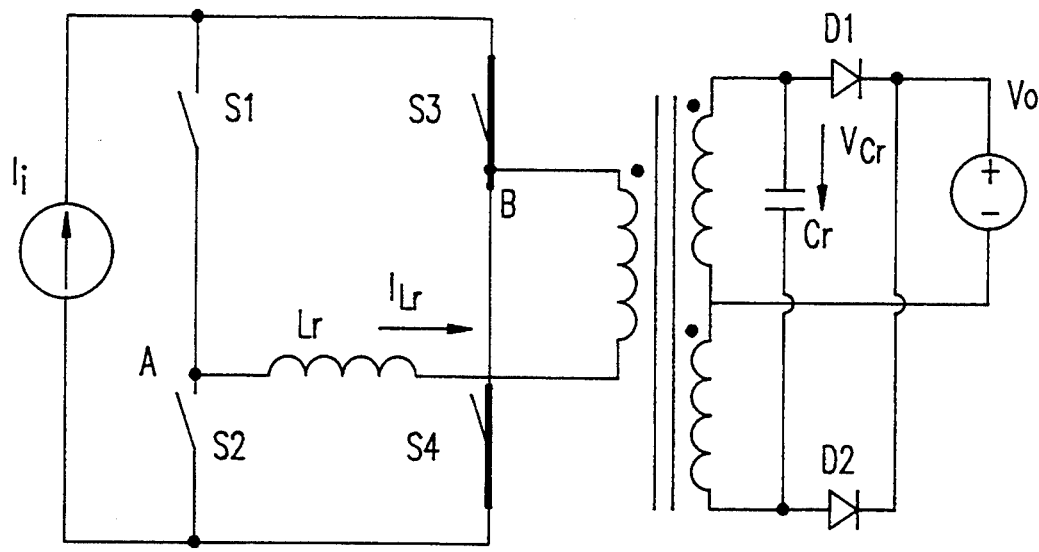
Figure 6H:
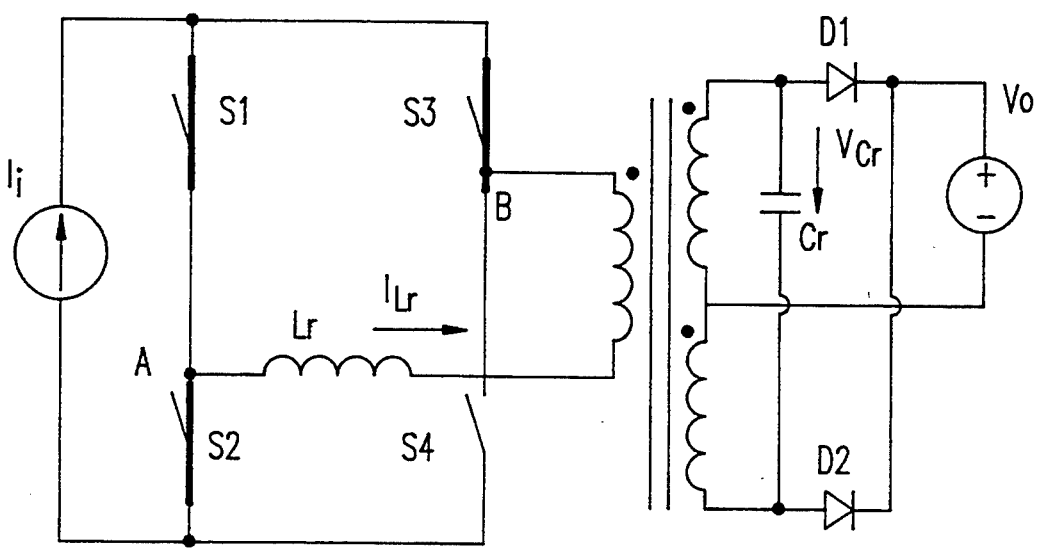
Figure 6I:
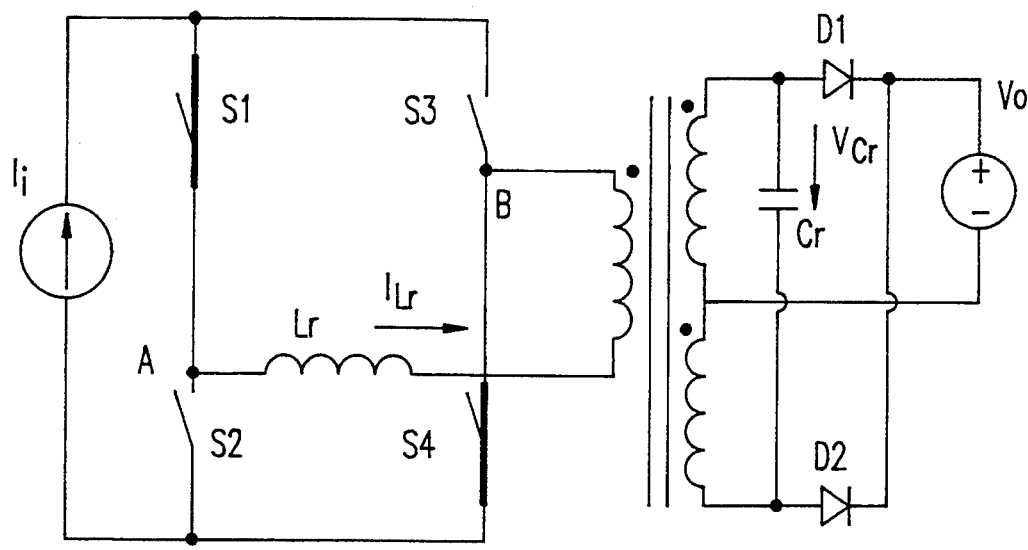
Figure 6J:
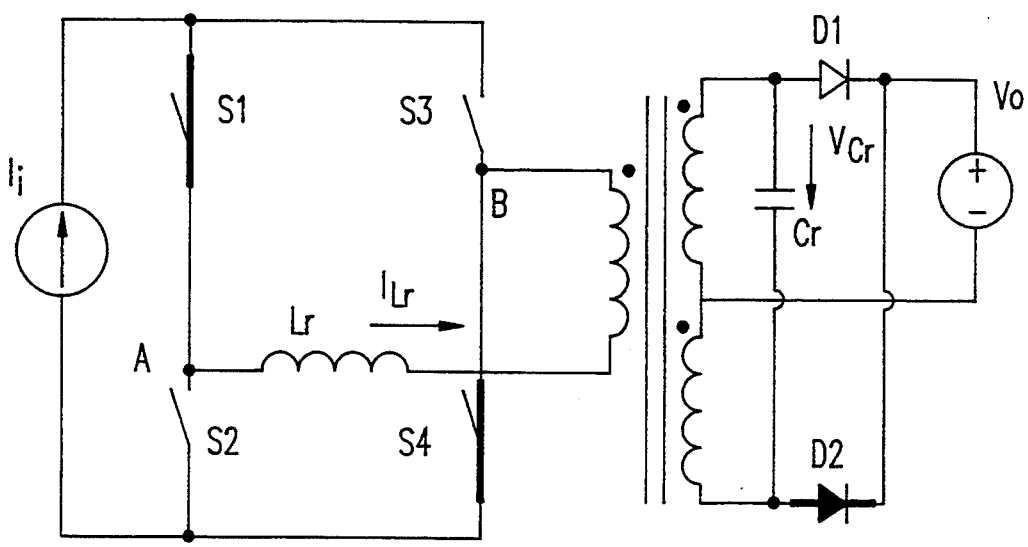

The key waveforms of this circuit are shown in FIG. 5. The input filter inductor is considered as a constant current source. The transformer magnetizing current is assumed to be negligible and is ignored. Ten topological stages exist within one switching interval:

(1) $t_0$–$t_1$: At $t=t_0$, S2 is turned on. During this interval, S1, S2, S4 and D2 are on. The reflected output voltage, $-(N_p/N_s)V_o$, is applied to the resonant inductor. Therefore, Lr current decreases linearly and the current initially flowing through S4 is transferred to S2 at a rate of $(N_p/N_s)V_o/L_r$. The equivalent circuit is shown in FIG. 6a. Switch S1 current and resonant capacitor voltage remain constant during this interval. At $t=t_1$, diode D2 reaches zero current, and is turned off with ZVS (because the diode voltage does not change at this moment).

(2) $t_1$–$t_2$: At $t=t_1$ the current through S4 is reduced to zero and S4 is turned off. A negative voltage, $-(N_p/N_s)V_o$, is applied to S4. Both diodes are off during this time.

(3) $t_2$–$t_3$: Switch S3 is turned on. ZCS is achieved due to resonance between Lr and Cr. Current through S1 is transferred to S3 in a resonant fashion during this time. At $t=t_3$, S1 is turned off. To achieve zero-current turn off for S1, the energy stored in Cr has to be large enough so that the peak Lr current can reach Ii value (i.e., S1 current can be forced to zero at $t_3$). ZCS operation can be achieved for all load and line conditions if the following expression is satisfied:

$$\tfrac{1}{2}C_rV_o^2 > \tfrac{1}{2}L_rI_{im}^2,$$

where $I_{im}$ is the maximum input current corresponding to low line and full load.

(4) $t_3$-$t_4$: When the inductor current reaches $I_i$ at $t_3$, S1 is turned off with ZCS. The resonant capacitor is discharged linearly until its voltage achieves $-V_o$, and the diode D1 is turned on at $t_4$.

(5) $t_4$-$t_5$: Switches S2, S3, and the freewheeling diode D1 are on during this interval. At $t_5$ S4 is turned on, starting the other half cycle of the switching interval.

(6) $t_5$-$t_0$: The circuit operation during this half switching cycle is symmetrical to the first half cycle, the equivalent circuits are shown in FIGS. 6(a-j).

In the proposed circuit, the active switches and rectifier diodes operate with ZCS and ZVS, respectively. Compared with traditional PWM converters, the switching losses are greatly reduced at the expense of a small increase in conduction loss. Compared with ZCS-QRCs, the conduction losses are significantly reduced because the currents through the switches are square-wave in nature. Furthermore, constant-frequency operation is feasible. Similar to a ZCS-QRC, the limitation of this converter is that the parasitic capacitances of the active switches are not utilized, resulting in parasitic ringing between the capacitances and the resonant inductor. However, this problem is less severe here since the resonant inductance needed in this converter is much smaller than that for a ZCS-QRC.

The active switch in FIG. 5 can be implemented by either a MOSFET in series with a voltage-blocking diode, or an IGBT, or a GTO. This technique is more attractive for high power applications when BJTs, IGBTs, or GTOs are employed.

A 80 KHz (switching frequency), 200 W ZCS-PWM converter with 100-200 V input and 48 V output was built. The power stage, shown in FIG. 5, consists of the following components:

S1-S4—IXGP10N50 (IXYs' IGBT, Vces=500 V, Ic=10 A, tf=2.0 us) in series with UES1106 (diode);
D1,D2—UES1403;
Lf—0.8 mH, magnetic core PQ 2016 (material H7c4);
TR—core: PQ 2625 (material H7c4);
  primary: 48 turns of magnet wire AWG #24;
  secondary: 15 turns, center tapped, magnet wire AWG #23×2;
Lr—12 uH, magnetic core RM 5Z52B (material H7c4);
Cr——22 nF, ceramic capacitor;
Cf——2×22 uF, aluminum capacitors.

Since the primary switches in the FB-ZCS-PWM converter also requires phase-shift control, the control circuit used for the FB-ZVS-PWM converter can be employed in this converter. FIG. 4 shows the oscillograms of the experimental ZCS-PWM converter. The efficiency of the converter drops significantly at low line and heavy load since the IGBTs begin to lose zero-current switching property.

The proposed converter is particularly attractive for high-power applications where high-power devices like IGBTs, BJTs, or GTOs are used. Since the proposed circuit is a boost-type converter and it offers isolation, it can be well used for power-factor-correction applications.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A full-bridge, phase shifted, pulse-width-modulated, zero-voltage-switching, d.c.-to-d.c. converter, comprising in combination:
   a d.c. voltage input;
   a transformer having a primary winding and a secondary winding;
   switching means including four transistor switches configured in a full-bridge network for coupling said d.c. voltage input to said transformer primary winding, said full bridge network being comprised of a first half-bridge network and a second half-bridge network connected in parallel;
   a phase shifted, pulse-width-modulating controller for opening and closing said semiconductor switches in a phase-shifted sequence between switches in said first half-bridge network and a second half-bridge network for pulse-width modulating said d.c. voltage input; and
   resonant circuit means, including a saturable reactor that stores energy and discharges parasitic capacitance of said transistor switches to establish a resonating voltage drop across each of said four transistor switches, which resonating voltage drop is substantially zero across said each of said four semiconductor switches at a time it switches from an off to an on state.

2. A full-bridge, pulse-width-modulated, zero-voltage-switching, d.c.-to-d.c. converter as in claim 1, wherein said saturable reactor is connected in series with said transformer primary winding.

3. A full-bridge, pulse-width-modulated, zero-voltage-switching, d.c.-to-d.c. converter as in claim 1, wherein said saturable reactor is connected in series with said transformer secondary winding.

4. A method of d.c.-to-d.c. conversion using a full-bridge, phase shifted, pulse-width-modulated, zero-voltage-switching, d.c.-to-d.c. converter, comprising the steps of:
   providing a d.c. voltage input to a transformer having a primary winding and a secondary winding;
   phase-shift controlling four semiconductor transistor switches configured in a full-bridge network, said full bridge network coupling said d.c. voltage input to said transformer primary winding and being comprised of a first half-bridge network and a second half-bridge network connected in parallel, said step of phase-shift controlling opening and closing said semiconductor switches in a phase-shifted sequence between switches in said first half-bridge network and a second half-bridge network for pulse-width modulating d.c. voltage input; and
   storing energy and discharging parasitic capacitance for said transistor switches through a resonant circuit including a saturable reactor to establish a resonating voltage drop across each of said four transistor switches, said resonating voltage drop is substantially zero across said each of said four semiconductor switches at a time it switches from an off to an on state.

* * * * *